United States Patent Office 3,556,715
Patented Jan. 19, 1971

3,556,715
AQUEOUS DYE BATH COMPOSITION AND PROCESS FOR THE DYEING OF SHAPED ARTICLES OF POLYACRYLONITRILE
Ernst Schmitt, Cologne-Buchheim, Walter Hees, Cologne-Hoehenberg, and Mathieu Quaedvlieg, Opladen, Germany, assignors to Farbenfabriken Bayer Aktiengesellschaft, Leverkusen, Germany, a corporation of Germany
No Drawing. Filed May 1, 1967, Ser. No. 634,898
Claims priority, application Germany, May 27, 1966, F 49,310
Int. Cl. D06p *5/00;* C07d *27/00*
U.S. Cl. 8—168         4 Claims

ABSTRACT OF THE DISCLOSURE

A process and article of manufacture obtained wherein shaped articles of polyacrylonitrile or copolymers of acrylonitrile with other vinyl compounds exemplified by vinyl chloride and acrylic acid alkyl esters, said articles being treated with a cationic dyestuff in a heated dyeing composition containing about .5–2.5% by weight of the quaternization product of an alkenyl-succinic acid imidamine.

---

The present invention relates to a process for the dyeing of shaped articles of polyacrylonitrile; more particularly it concerns a process which comprises dyeing the shaped articles of polyarylonitrile with cationic dyestuffs in the presence of the quaternisation products of alkenyl-succinic acid imidamines of the formula

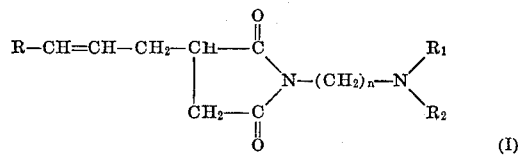

in which R represents an alkyl radical containing 6 to 22 carbon atoms, and $R_1$ and $R_2$ stand, independently of one another, for alkyl radicals containing 1 to 3 carbon atoms, while $n$ is a number from 2 to 6.

The quaternisation products according to the invention can be obtained, for example, by reacting olefines of the formula

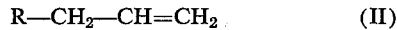

$$R—CH_2—CH=CH_2 \qquad (II)$$

in which R has the same meaning as above, with maleic anhydride to give the alkenyl-succinic anhydrides of the formula

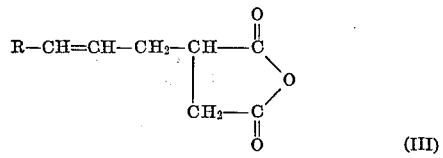

converting the reaction products with diamines of the formula

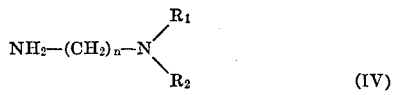

in which $R_1$, $R_2$ and $n$ have the same meaning as above, into the compounds of the Formula I and treating the latter with the conventional quaternising agents.

Examples of olefines of the Formula II include: undecene-(1), dodecene-(4), octadecene-(1), nonadecene-(1) and eicosene-(1), or mixtures thereof; as diamines of the Formula IV there may be used, e.g. 3-dimethyl-aminopropylamine and 6-dimethyl-aminohexylamine, and examples of quaternising agents are benzyl chloride, chloromethyl-phthalimide and dimethyl sulphate.

The necessary amounts of the quaternisation products can be readily determined by preliminary experiments; in general, amounts of 0.5 to 2.5%, calculated on the shaped articles of polyacrylonitrile to be dyed, have proved to be sufficient.

The cationic dyestuffs used for the process of the present invention may belong to a great variety of groups. Suitable dyestuffs are, for example, diphenylmethane dyestuffs, triphenylmethane dyestuffs, rhodamine dyestuffs and onium group-containing azo or anthraquinone dyestuffs; furthermore thiazine, oxazine, methine and azomethine dyestuffs (cf., e.g., American Dyestuff Reporter, 1954, pages 432 and 433).

The shaped articles of polyacrylonitrile can be dyed in usual manner by introducing the material to be dyed into an aqueous bath heated to about 50 to 60° C. and containing a cationic dyestuff, a quaternisation product to be used according to the invention, additions of salts, such as sodium acetate or sodium sulphate, as well as acids, such as acetic acid or formic acid, subsequently increasing the temperature of the dyebath to approximately 100° C. in the course of about 30 minutes, and then keeping the dyebath at this temperature until the bath is exhausted. Alternatively, the basic dyestuff may subsequently be added to the dyebath, for example, at the time when the temperature of the bath has risen to about 60° C. Furthermore, the material to be dyed may be pretreated at a temperature of 40 to 100° C. with a liquor which contains the customary salts and acids as well as the quaternisation product according to the invention, but not yet a dyestuff, only thereafter adding the dyestuff and carrying out the dyeing at 100° C. Finally, it is also possible to introduce the material to be dyed immediately into the dyebath heated to approximately 100° C. and containing a quaternisation product according to the invention. With the aid of the process according to the invention it is possible to dye a great variety of shaped articles obtained from polyacrylonitrile, such as cable sheathings, filaments, flocks, combed materials, yarns, woven or knitted fabrics, in an outstanding uniform manner, and this is also possible, in contrast to the quaternary ammonium compounds hitherto used, in those cases in which shaped articles of polyacrylonitrile are dyed in colours which bleed very rapidly.

The term shaped articles made of polyacrylonitrile, comprises in the present case also those materials which are produced by also using, in combination with acrylonitrile, other vinyl compounds, such as vinyl chloride, vinyl acetate, vinylidene chloride, vinylidene cyanide and acrylic acid alkyl ester.

The following examples serve to illustrate the invention without, however, limiting the scope thereof.

EXAMPLE 1

Yarns made of polyacrylonitrile fibres are introduced into a dyebath having a goods-to-liquor ratio 1:40 and containing, per litre, 0.125 g. of the dyestuff (Colour Index, 2nd edition, No. 51,005), 0.5 g. glacial acetic acid, 0.5 g. sodium acetate and 0.25 g. of the quaternisation product of the formula

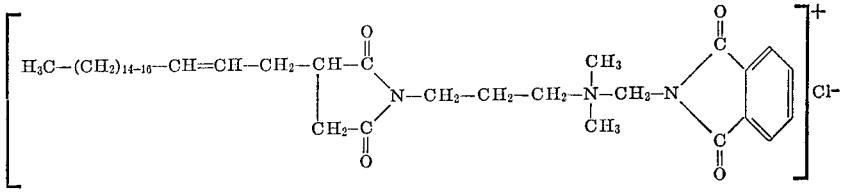

Dyeing is started at 60° C., the temperature of the bath is then increased to 98° C. and the bath is kept at boiling temperature for about 90 minutes. A pale blue dyeing of excellent uniformity is obtained.

The quaternisation product used was prepared in the following manner: 300 g. olefines having a chain length of 18 to 20 carbon atoms were heated at 220° C. for 4 hours in a nitrogen atmosphere. The reaction mixture was subsequently subjected to a vacuum distillation. When 202 g. of first runnings had been distilled over at 3 mm. Hg and at a temperature between 140° C. and 188° C., there were obtained as the main fraction, at 1.4 to 2.2 mm. Hg and at a temperature ranging from 237° C. and 242° C., 139 g. alkenyl-succinic anhydride. 60 grams of this anhydride were heated at 190° C. for 3 hours with 103 g. 3-dimethylamino-propylamine. From this reaction mixture, unreacted amine and the water formed in the reaction were then distilled off at 20 mm. Hg. 22.5 grams of the distillation residue and 10.2 g. N-chloromethyl-phthalimide were subsequently dissolved in 100 ml. methylene chloride, the solution was allowed to stand at room temperature for 2 days, and the solvent was then distilled off at 20 mm. Hg and at an external temperature of at most 70° C. The brownish yellow, hygroscopic quaternisation product remained as the residue. It can be added to the dyebath as such or in the form of an aqueous solution.

EXAMPLE 2

A fabric of polyacrylonitrile fibres is introduced into a bath having a goods-to-liquor ratio 1:40, heated to 60° C. and containing, per litre, 0.125 g. of the cationic dyestuff obtained by methylation of 2-chloro-4-nitroaniline→N-ethyl-N-(β-dimethylaminoethyl)-aniline, 0.5 g. glacial acetic acid, 0.5 g. sodium acetate and 0.2 g. of the quaternisation product of the formula

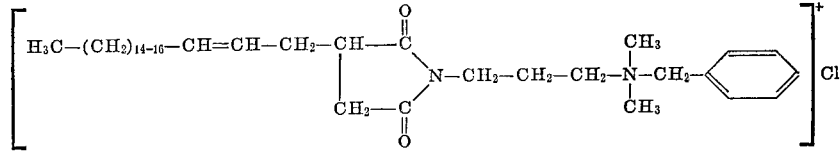

The bath is then slowly heated to 98° C. and kept at this temperature for about 90 minutes. A pale red dyeing of excellent uniformity is obtained.

The quaternisation product used was prepared as follows: 45 g. of the distillation residue described in Example 1 and obtained after the reaction of alkenyl-succinic anhydride with 3-dimethylamino-propylamine, and 13 g. benzyl chloride were dissolved in 100 ml. methylene chloride, the solution was allowed to stand at room temperature for 2 days, and the solvent then distilled off at 20 mm. Hg and at an external temperature of at most 70° C. The brownish yellow, hygroscopic quaternisation product remained as the residue. It can be added to the dyebath as such or in the form of an aqueous solution.

We claim:
1. A process for dyeing of shaped articles made of homopolymers of acrylonitrile or copolymers of acrylonitrile with a vinyl compound, comprising dyeing the shaped articles with cationic dyestuffs in the presence of an active amount of the quaternization product of an alkenyl-succinic acid imidamine of the formula

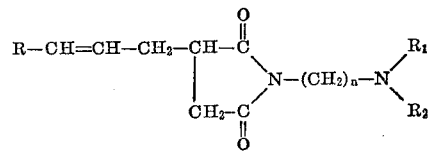

in which

R is alkyl of 6–22 carbon atoms;
$R_1$ and $R_2$ are independently defined as alkyl of 1–3 carbon atoms; and
$n$ is 2–6.

2. The process of claim 1 wherein the shaped article comprises polyacrylonitrile or a copolymer of acrylonitrile with a monomer selected from the group consisting of vinyl chloride, vinyl acetate, vinylidene chloride, vinylidene cyanide and acrylic ester.

3. The process of claim 1 wherein R is an alkyl radical of 15–17 carbon atoms; and quaternization is effected by contacting the imidamine with an active amount of a member selected from the group consisting of benzyl chloride, chloromethyl-phthalimide and dimethyl sulfate.

4. An aqueous dyebath compoistion containing a cationic dyestuff for dyeing polyacrylonitrile materials and about .5–2.5% by weight referred to the weight of the articles being dyed, of the quaternization product of claim 1.

References Cited

UNITED STATES PATENTS 2,986,444   5/1961   Rokohl et al. _____ 8—177
3,098,690   7/1963   Guion _____ 8—84

GEORGE F. LESMES, Primary Examiner

P. C. IVES, Assistant Examiner

U.S. Cl. X.R.

8—4, 84, 172, 177; 260—326.5